United States Patent [19]

Khattab et al.

[11] 3,966,414

[45] June 29, 1976

[54] TIME TEMPERATURE INDICATORS

[75] Inventors: Ghazi Khattab, Parsippany; Robert J. Witonsky, Princeton, both of N.J.

[73] Assignee: Bio-Medical Sciences, Inc., Fairfield, N.J.

[22] Filed: Jan. 16, 1974

[21] Appl. No.: 433,925

[52] U.S. Cl. .......................... 23/253 TP; 23/230 R; 23/230 B; 73/356; 116/114 V; 252/408; 426/88
[51] Int. Cl.² ...................... G01K 3/04; G01K 3/10; G01K 11/12; G01N 31/22
[58] Field of Search ............... 252/408; 23/253 TP; 73/356; 23/230 R, 230 B; 116/114 V, 114 AM, 114 AJ, 114.5; 426/88

[56] References Cited
UNITED STATES PATENTS

| | | | |
|---|---|---|---|
| 1,216,303 | 12/1915 | Freeman | 23/253 TP |
| 2,606,654 | 8/1952 | Davis et al. | 252/408 |
| 2,671,028 | 3/1954 | Clark | 73/356 |
| 2,889,799 | 6/1959 | Korpman | 116/114 V |
| 3,012,976 | 12/1961 | Adams, Jr. et al. | 23/253 TP |
| 3,067,015 | 12/1962 | Lawdermilt et al. | 116/114 V |
| 3,390,121 | 6/1968 | Burford et al. | 252/408 X |
| 3,751,382 | 8/1973 | Ljungberg et al. | 252/408 |
| 3,768,976 | 10/1973 | Hu et al. | 23/253 TP |
| 3,853,471 | 12/1974 | Rittersdorf et al. | 23/253 TP |
| 3,853,472 | 12/1974 | Rittersdorf et al. | 23/253 TP |

*Primary Examiner*—Leland A. Sebastian
*Assistant Examiner*—T. S. Gron
*Attorney, Agent, or Firm*—Anthony Lagani, Jr.

[57] ABSTRACT

A system operable to signal the attainment of a preselected time-temperature integral for monitoring the temperature history of a product utilizes a free-radical sensitive dye and a peroxide on a carrier.

5 Claims, No Drawings

TIME TEMPERATURE INDICATORS

DETAIL DESCRIPTION

The present invention pertains to an indicator system which signals the attainment of a pre-selected time-temperature integral.

It is now recognized that various natural and synthetic materials decompose with the passage of time even when taking such precautions such as storing under refrigeration, packaging in an inert atmosphere, sterilization, and adding spoilage retardants. Thus, for example, foods, films, pharmaceuticals, biological preparations and the like, can demonstrate decomposition with the passage of time, even when sterilized or maintained at sufficiently low temperatures to preclude microbiological degradation. Such decomposition occurs for various reasons, including strictly chemical reactions, such as oxidation, and enzymatic processes. Consequently there is for each material of this type, a limit to its permissible storage life at which time a discernable change in some property occurs. A system which would indicate when this limit has been exceeded would be extremely valuable.

The deterioration kinetics involved in such processes can be exceedingly complex. For example, while it is clear that deterioration is a function of temperature, the rate of deterioration of such products can also vary with temperature so that one rate of deterioration will exist at a first temperature with a different rate at a second temperature. The total amount of deterioration will depend upon the time at which the product is held at each temperature, i.e. the integral of time and temperature. The practical effect of this can be seen for example from two identical samples of Frozen food packaged simultaneously. For both of these, there will be a finite time-temperature integral until a discernible change in quality occurs. If one package is allowed to thaw, or even rise in temperature by 10 or 20°C, in the course of distribution or storage, its life will be reduced even after being refrozen, as compared with the other package which was maintained at a lower temperature for its entire storage life. To a consumer about to purchase these packages, both of which are now stored at normal freezer temperature, there is no way to ascertain this significant difference in their temperature histories.

A system has recently been suggested for monitoring the temperature history of a product. Thus U.S. Pat. No. 3,751,382 discloses an enzymatic indicator in which urease decomposes urea with the reaction products causing a change in the pH of the system. The activity of the urease, and thus rate of decomposition, is dependent on temperature so that the change in pH resulting from this decomposition can be monitored by conventional acid-base indicators. This system, which appears to be directed at the specific problem of microbiological putrefaction rather than the broader problem of overall decomposition, suffers from the inherent limitations of any enzymatic reaction. Thus while enzyme activity is a function of temperature, it is also sensitive to the very passage of time being measured, enzymatic activity generally decreasing with time. Enzyme activity is also sensitive to pH change and such change is the operative factor in this system.

A further problem is the fact that the second derivative of time-temperature decomposition (the change in rate per unit of temperature change) differs for different products. Thus the change in the rate of deterioration per unit of temperature change for certain fruits and berries is vastly different from the change in rate for lean meats. Dairy products are different from both. Consequently, a system which is dependent on a single enzymatic reaction will be suitable as an indicator only for those materials having a similar slope for the rate of decomposition-temperature relationship. Although U.S. Pat. No. 3,751,382 describes a method for modifying the time at which the indicator's color change occurs, the activation energy of the enzyme system is not changed and the ratio of change in reaction rate per temperature unit remains substantially the same.

Finally, prior art devices and systems have been primarily liquid in nature and thus require liquid containers such as ampoules or envelopes. These can be bulky and are subject to breakage, leakage and/or contamination.

The present indicator system is extremely simple in operation and construction. Moreover it is adaptable for use on a solid matrix. Finally, changes in the relationship of the rate at which the indicator responds to temperature changes are easily built into the system.

The first component of the present invention is a free-radical sensitive dye. Numerous dyes of this type are well known, although generally their sensitivity to free radicals is considered an undesirable feature. Thus these dyes are attacked by free radicals and either lose their original color or take on a new color through oxidative extraction of a hydrogen atom. Either effect however, can be advantageously utilized in the present invention. Such dyes include a wide variety of triphenylmethane dyes such as Brilliant green, Malachite green, fuchsin, Gentian violet, rosaniline, eosin and the like. It is desirable in most instances that the dye not be color sensitive to pH change in the normal pH range to which it will be subjected. Thus while phenolphthalein is free radical sensitive, it also undergoes the well known color change from red to colorless in the pH range of 9 to 8.5, and accordingly is suitable in the present invention only in applications in which the pH is 9 or more.

The second component of the present system is an organic peroxide. By organic peroxide is intended a compound of the formula

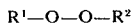

$$R^1-O-O-R^2$$

in which $R^1$ and $R^1$ are organic radicals. Such materials undergo thermal decomposition to yield the free radicals $R^1O\cdot$ and $R^2O\cdot$ which in turn can extract a hydrogen atom from the free radical sensitive dye. The significance of the groups $R^1$ and $R^2$ is discussed below and while their selection has an effect on the parameters of the indicator so that it is suitable for a particular application or use, their nature is not critical in a structure-function sense. Thus $R^1$ and $R^2$ can comprise an essentially hydrocarbon portion such as alkyl, alkenyl, cycloalkyl, phenyl, phenylalkyl, phenoxyalkyl and the like, and optionally a second linking portion by which the hydrocarbon group is attached to the peroxy group. The carbon content of the hydrocarbon groups is not critical and thus alkyl can have from 1 to about 20 carbon atoms, alkenyl from 2 to about 20 carbon atoms, and cycloalkyl from 3 to 7 carbon atoms. The nonaromatic hydrocarbon can be branched or straight and further substituents which do not enter into any reaction with the dye or peroxy group, can be optionally present; e.g. mono- and dichlorophenyl, methyl-, dimethyl- and dimethylphenyl, etc. $R^1$ and $R^2$ can also be hydrogen. The hydrocarbon portion can be directly bound to the peroxy group or, as noted above, can be linked through a carbonyl, sulfonyl or oxycarbonyl group. The peroxide can be symmetrical or unsymmetrical and more than one peroxy group can be present.

Typical peroxides of this type include acetyl cyclohexylsulfonylperoxide, dibenzylperoxy dicarbonate, dicyclohexylperoxy dicarbonate, diisopropylperoxy dicarbonate, 2,4-dichlorobenzoylperoxide, decanoylperoxide, lauroylperoxide, t-butylperoxymaleic acid, 1-hydroxy-1-hydroperoxydicyclohexylperoxide, 2,5-dimethyl-2,5-bis-(benzoylperoxy)hexane, benzoyl peroxide, phenoxyethylperoxy dicarbonate and the like. The foregoing representative embodiments are not to be construed as limitations on the structure of the peroxides. Quite to the contrary, it can be seen that a wide variety of structures are permissible since the operative part of the molecule is the peroxy group (—O—O—) and not the $R^1$ and $R^2$ groups. The effect of different $R^1$ and $R^2$ groups is one of modifying the activation energy and half-life of the peroxide compound and thus groups which are generally not considered structurally analogous can result in fully equivalent peroxides for the present invention.

The dye and the peroxide are supported on a peroxide inert carrier as for example glass fiber paper, alumina, silica gel and the like. The carrier can be supported on various polymeric material such as cellulose derivatives, polyvinyl chloride, polyethylene and the like. The nature of the carrier is not critical provided it is inert to organic peroxide.

Upon combining the peroxide and the free radical sensitive dye, the color change process is initiated as the thermal-decomposition of the peroxide generates free radicals which attack the dye. This color change will not be immediate but will rather occur at some subsequent point in time which point is determined by the decomposition half-life of the peroxide, the ratio of peroxide to dye and the integral of time and temperature to which the system is exposed. The design of a specific embodiment is approached in the following manner.

As noted above, the quotient of (a) the ratio of change at one temperature of an article's property whose deterioration is being monitored to (b) the rate of change at a lower temperature differs for various materials. This value is often expressed for ten degree increments and represented by the symbol "$Q_{10}$" for the Centigrade scale and "$q_{10}$" for the Fahrenheit scale. For example, within the range of 0 to $-20°C$, raw fatty meat and pre-cooked fatty meat have $Q_{10}$'s of about 3, whereas raw lean meat and pre-cooked lean meat have $Q_{10}$'s between 5 and 6. Vegetables generally have a $Q_{10}$ of between 7 and 8, whereas fruits and berries have a $Q_{10}$ of approximately 13. It is thus possible to select a peroxide whose change in rate of decomposition per unit change in temperature approximates the $Q_{10}$ of a given food class. For this purpose, one can utilize the activation energy values of the peroxides.

The relationship between $Q_{10}$ and the activation energy is as follows:

$$\text{(equation 1)} \quad Q_{10} = e^{10 E_a / T_1 \cdot T_2 \cdot R}$$

where
$E_a$ = the activation energy
$T_1$ = a first temperature in degrees (absolute)
$T_2$ = a second temperature ten degrees lower than $T_1$ and
$R$ = the gas constant.

Within, for example, the range of $-10°$ to $-20°C$, an important region for frozen foods, the following values are obtained:

| $E_a$ Kcal/mole | $Q_{10}$ | $q_{10}$ |
|---|---|---|
| 0.0 | 1.00 | 1.00 |
| 5.0 | 1.46 | 1.23 |
| 8.0 | 1.83 | 1.40 |
| 10.0 | 2.13 | 1.52 |
| 12.0 | 2.48 | 1.66 |
| 15.0 | 3.11 | 1.88 |
| 20.0 | 4.54 | 2.31 |
| 22.0 | 5.28 | 2.52 |
| 25.0 | 6.63 | 2.86 |
| 27.0 | 7.71 | 3.11 |
| 30.0 | 9.61 | 3.52 |
| 33.0 | 12.1 | 4.00 |
| 34.0 | 13.0 | 4.16 |

It is thus possible to prepare indicators which parallel the decomposition rates of various materials, even in the course of temperature fluctuation over a period of time. The point at which a signal should be given by the indicator depends upon deterioration property being monitored. For example, if a discernible change in the taste of a product is known to occur after 500 hours at $0°C$, the indicator would be formulated so as to undergo a color change just prior to or at 500 hours at $0°C$. It will of course be appreciated that the same discernable change might occur in the product in about 60 hours at $20°C$ or in less than 10 hours at about $40°$ and that this pattern of changes in rate with temperature corresponds to the $Q_{10}$ value discussed above.

In order to achieve a signaling of the indicator at a preselected integral of time and temperature which corresponds to the occurrence of the discernible change in the material being monitored, the half-life and first order rate constant for the various peroxides must be considered. From these values, it is possible to formulate the indicator with sufficient peroxide so that all of the free radical sensitive dye will have been attacked at the desired time-temperature integral.

Since the thermal decomposition of a peroxide decreases asymptotically with time, it is necessary to utilize a stoichiometric excess of peroxide. Utilization of at least one molar excess (2 moles of peroxide/mole of dye) thus permits working within the half-life of the peroxide and indeed it is often desirable to use even greater excess. In this way the rate of decomposition which one considers approaches linearity. Hence while it is necessary to utilize at least an excess of peroxide over the dye, and practically speaking at least a one molar excess, the magnitude of the excess is a matter of convenience.

The relationship of the amount of peroxide to be added for a given amount of dye is expressed by the following:

$$C_P = \frac{C_D}{1 - e^{-(kt)}} \quad \text{(equation 2)}$$

in which
$C_P$ = the molar concentration of peroxide
$C_D$ = the molar concentration of the dye
$k$ = the rate constant at the selected temperature, and $t$ = time at which the indicator should change color.

The design of an indicator for a vegetable product, for example, having a $Q_{10}$ of 7.5 and a life of 100 hours at 15°C, one would proceed as follows: From equation 1, it can be determined that a suitable peroxide would be one having an activation energy of about 27 Kcal/mole. From published data it can be determined that diisopropyl peroxycarbonate and t-butylperoxymaleic acid, to mention but two examples, both have activation energies of about 27 Kcal/mole. Lauroylperoxide on the other hand would not be desirable for this particular product, since it has an activation energy of about 30 Kcal/mole but would be suitable for a product having a $Q_{10}$ of about 9.6. Having selected a suitable peroxide, one then selects a dye. The nature of the dye is not critical. Malachite green, for example, is converted from its natural green color to colorless under the influence of free radicals. The amount of dye utilized in the indicator system is a matter of convenience If the carrier contains one part of dye and desiring that the indicator signals at 100 hours at 15°C, it can be seen from equation 2 that 12.1 molar equivalent parts of diisopropyl peroxydiccarbonate are necessary.

$$C_p = \frac{1 \text{ mole}}{1 - e^{(0.0009 \cdot 100 \text{ hrs})}}$$

$C_p = 12.1$ molar equivalents

Accordingly, an indicator containing 10 milligrams of Malachite green and 68 milligrams of diisopropyl peroxydicarbonate would lose its green color after approximately 100 hours at 15°C. It should be noted that as a result of the activation energy value by which this particular peroxide was selected, the indicator would signal in approximately 950 hours if held at 5°C and approximately 10 hours if held at 25°C. Calculations show that these values correspond to the times at which a discernible change would occur in the property being monitored where that property change has a $Q_{10}$ of 9.6.

Utilizing the same example, one can employ a peroxide which has a comparable activation energy but a lower rate constant. In order to achieve the same signal parameters specified above, the concentration of the peroxide would be increased to satisfy equation 2. In this way, while the same molar amount of free radicals would be generated by the peroxide, it would be over a smaller proportion of the peroxide's half life since the rate constant is lower and thus the decomposition rate of the peroxide would be more linear. Typical values for various peroxides are as follows:

| Peroxide | Temp. (C°) | Decomposition Half Life (Hrs.) | First Order Rate Constant (K) | Activation Energy (Kcal/Mole) |
|---|---|---|---|---|
| Acetyl cyclohexyl-sulfonylperoxide | 30 | 13 | 0.052 | 35 |
|  | 40 | 2.0 | 0.339 |  |
|  | 45 | 0.92 | 0.755 |  |
| Dibenzyl peroxydicarbonate | 40 | 9.5 | 0.073 |  |
|  | 50 | 3.1 | 0.225 | 27.6 |
|  | 60 | 0.72 | 0.962 | 28 |
| Dicyclohexyl peroxydicarbonate | 45 | 7[2] | 0.100 |  |
|  | 50 | 3.5[2] | 0.201 | 27.8 |
|  | 60 | 0.90[2] | 0.746 | 28 |
| Diisopropyl peroxydicarbonate | 30 | 88 | 0.008 |  |
|  | 45 | 11 | 0.065 | 27 |
|  | 60 | 1.5 | 0.461 |  |
| Decanoyl peroxide | 60 | 13 | 0.055 |  |
|  | 70 | 3.4 | 0.204 | 30 |
|  | 85 | 0.51 | 1.37 |  |
| Lauroyl peroxide | 60 | 13 | 0.054 |  |
|  | 70 | 3.4 | 0.201 | 30 |
|  | 85 | 0.51 | 1.35 |  |
| t-Butylperoxy-maleic acid | 70 | 68[3] | 0.010 |  |
|  | 85 | 12[3] | 0.057 | 27 |
|  | 100 | 2.8[3] | 0.244 |  |
| 1-Hydroxy-1-hydroperoxydicylohexyl peroxide | 85 | 20 |  |  |
|  | 100 | 3.8 |  |  |
|  | 115 | 1.0 |  |  |
|  | 130 | 0.37 |  |  |
| 2,5-Dimethyl-2,5 bis(benzoylperoxy) hexane | 100 | 10[4] | 0.067 |  |
|  | 115 | 1.5[4] | 0.449 | 37 |
|  | 130 | 0.27[4] | 2.57 |  |
| Dicumyl Peroxide | 115 | 9.4 | 0.074 |  |
|  | 130 | 1.8 | 0.377 | 38 |
|  | 145 | 0.28 | 2.47 |  |
| αα-Bis(t-Butylperoxy)Diiopropyl Benzene | 115[5] | 10 | 0.067 |  |
|  | 125[5] | 3.9 | 0.177 | 35 |
|  | 130[5] | 2.0 | 0.346 |  |

Notes:
determined in benzene at 0.2M conc. unless otherwise noted
[2]determined in mineral spirits at 0.1M conc.
[3]determined in acetone
[4]determined at 0.05M
[5]determined at 0.1M A significant consideration to be kept in mind in the actual practice of the invention is the fact that the above mathematical treatment is based on the theoretical ideal and assumes the complete purity and lack of any prior decomposition of the peroxides. Since neither of these can be totally eliminated, some adjustment is necessary. The degree of absorption of different carriers or of some of the same carrier from different sources will also vary and cannot be predicted. Moreover, the available rate constants are generally determined in an inert solvent system and at higher temperatures than are encountered in the use of the actual indicators. Thus the rate constants generally must be extrapolated for the lower temperatures and and some variation will also occur since the reaction takes place in a solid state. Hence while these mathematical treatments are useful for preliminary design, adjustments in the amount of material must be made in order to compensate for individual variations of the particular materials employed, the solid reaction state and the inherent discrepancy in extrapolation techniques. Since these variations will differ, correction is most conveniently made on an empirical basis. Thus after selection of an appropriate peroxide, the exact amount of peroxide to give a desired time-temperature integral is most conveniently determined on an experimental basis for the particular materials to be used.

A further consideration is the possibility of internal catalysis. Thus it is known that N,N-dialkylanilino groups can accelerate the decomposition of organic peroxides. Where the dye contains such a group, adjustments in the amounts of the components can be made. Alternatively dyes which do not contain N,N-dialkylanilino groups can be employed.

It should also be appreciated that the present system is not limited in application to monitoring long storage periods at low temperatures. The same considerations apply to short periods at high temperatures. Thus the present system can also be used to insure, for example, that products have been adequately sterilized. Hence when canned goods are autoclaved, the present indicator can be used to insure that the product has been subjected to the appropriate time-temperature integral necessary for product sterilization. In this case the firing of the indicator would be used as the signal that the necessary parameters have been reached or exceeded, e.g., 121°C for at least 15 minutes.

Preparation of the actual indicator is accomplished by combining the peroxide and dye in an inert organic solvent such as benzene, chloroform, acetone, carbon tetrachloride or the like. The solvent is not critical and can be varied widely depending upon the solubility and the particular dye and peroxide chosen. The carrier, which can be a sheet, ribbon, thread or the like, is immersed in the solution. Alternatively, the solution is applied to all or part of the carrier. The application can be in the form of a stamp so that the dye and peroxide form a word or indicia. Alternatively, the carrier may be completely dyed and the peroxide then applied to only a portion thereof so that this portion becomes visible at the indicator signal point. The solvent is removed by convenient evaporation and the indicator affixed to product.

The following examples will serve to typify the nature of the invention but should not be construed as a limitation on the scope thereof.

EXAMPLE 1

A solution is prepared by dissolving 0.005M of Brilliant green and 0.05M lauroylperoxide in chloroform. This solution is applied to Whatman glass fiber paper which immediately takes on the green color of the dye. Individual pieces of the paper are then stored at different temperatures and the times at which the green color is lost is noted.

| Storage Temperature | Time to Color Loss (hours) |
|---|---|
| 42°C | 6 |
| 22°C | 62 |
| 3°C | 528 |
| −18°C | (>1300) |

By increasing the concentration of lauroylperoxide to 0.125M the following values are obtained:

| Storage Temperature | Time to Color Loss (hours) |
|---|---|
| 42°C | .4 |
| 22°C | 15 |
| 3°C | 130 |
| −18°C | 1050 |

EXAMPLE 2

To separate 0.005M solutions of Brilliant green dye in chloroform are added 0.05M of benzoylperoxide (A) and phenoxyethyl peroxycarbonate (B). The solutions are applied to Whatman glass fiber paper and tested in the manner described in Example 1. The results are as follows:

| Storage Temperature | Time to Color Loss (hours) | |
|---|---|---|
| | Peroxide A | Peroxide B |
| 42 | 3 | 1 |
| 22 | 50 | 3 |
| 3 | 432 | 45 |
| −18 | (>1300) | ~400 |

What is claimed is:
1. An indicator system operable to signal the attainment of a preselected value corresponding to the integral of the temperatures to which said system has been exposed as a function of time comprising:
   a. a free radical sensitive dye;
   b. at least a one molar excess based on said dye on an organic peroxide having the formula

$$R^1-O-O-R^2$$

wherein each of $R^1$ and $R^2$, independent of the other, is (I) a hydrocarbon group selected from the group consisting of alkyl, alkenyl, phenyl, phenylalkyl, cycloalkyl, phenoxyalkyl and substituted derivatives thereof or (II) said hydrocarbon group linked to the peroxy group through a carbonyl, oxycarbonyl or sulfonyl group; and
   a solid, peroxide inert carrier; wherein a mixture of said free radical sensitive dye and organic peroxide is supported on said solid, peroxide inert carrier; whereby said dye changes color in the system as a result of free radical generation from the decomposition of said organic peroxide.

2. An indicator system as defined in claim 1 wherein said dye is a triphenylmethane derivative.

3. An indicator system as defined in claim 1 wherein the peroxide has a thermal decomposition activation energy of from about 5 to about 34 Kcal/mole.

4. An indicator system as defined in claim 1 wherein said dye is selected from the group consisting of Malachite green, Brilliant green, Gentian violet, fuchsin and eosin and said peroxide is selected from the group consisting of lauroylperoxide, benzoylperoxide and phenoxyethylperoxy dicarbonate.

5. An indicator system as defined in claim 1 wherein said organic peroxide is selected from the group consisting of acetyl cyclohexylsulfonylperoxide, dibenzylperoxyl dicarbonate, dicyclohexylperoxy-dicarbonate, diisopropylperoxy dicarbonate, 2, 4-dichlorobenzoylperoxide, decanoylperoxide, lauroylperoxide, t-butylperoxymaleic acid, 1-hydroxy-1-hydroperoxydicyclohexylperoxide, 2, 5-dimethyl-2, 5-bis-(benzoylperoxy) hexane, benzoyl peroxide and phenoxyethylperoxy dicarbonate.

* * * * *